United States Patent
Yang

(10) Patent No.: US 6,869,990 B2
(45) Date of Patent: Mar. 22, 2005

(54) AGRICULTURAL SOLID WASTE COMPOSITION AND PRODUCT MADE FROM THE SAME

(76) Inventor: Kuo-Chen Yang, No. 20, Lane 163, Chung-Jen St., Hsi Dist., Taichung City (TW)

( * ) Notice: Subject to any disclaimer, the term of this patent is extended or adjusted under 35 U.S.C. 154(b) by 216 days.

(21) Appl. No.: 10/392,924

(22) Filed: Mar. 21, 2003

(65) Prior Publication Data

US 2004/0186197 A1 Sep. 23, 2004

(51) Int. Cl.$^7$ .............................. C08K 5/04; C08K 5/09; C08K 3/10
(52) U.S. Cl. ........................... 524/22; 524/47; 524/399; 524/400; 524/413; 524/434
(58) Field of Search ............................. 524/22, 47, 399, 524/400, 413, 434

(56) References Cited

U.S. PATENT DOCUMENTS 5,679,145 A * 10/1997 Andersen et al. ........ 106/162.5
5,709,827 A * 1/1998 Andersen et al. ............. 264/42

* cited by examiner

Primary Examiner—Kriellion A. Sanders
(74) Attorney, Agent, or Firm—Baker Botts L.L.P.

(57) ABSTRACT

An agricultural solid waste composition contains 81–90% by weight of a powdered agricultural solid waste, 9–15% by weight of water, and 1–4% by weight of a binder. The binder contains 85–95% by weight of a gel material, 2–7% by weight of a sulfate, 2–7% by weight of a stearate, and 0.5–2% by weight of a skin forming agent. The skin forming agent contains 75–85% by weight of the gel material, 6–10% by weight of calcium chloride, and 9–15% by weight of alum.

11 Claims, 1 Drawing Sheet

AGRICULTURAL SOLID WASTE COMPOSITION AND PRODUCT MADE FROM THE SAME

BACKGROUND OF THE INVENTION

1. Field of the Invention

This invention relates to an agricultural solid waste composition, more particularly to an agricultural solid waste composition and a product made from the same.

2. Description of the Related Art

Wooden products, such as pallet, use a large amount of wood as raw material, thereby resulting in a high manufacturing cost and fast consumption of trees.

SUMMARY OF THE INVENTION

Therefore, the object of the present invention is to provide an agricultural solid waste composition and a product that is made from the same and that is capable of overcoming the aforementioned drawbacks of the prior art.

According to the present invention, there is provided an agricultural solid waste composition that comprises: 81–90% by weight of a powdered agricultural solid waste; 9–15% by weight of water; and 1–4% by weight of a binder. The binder contains 85–95% by weight of a gel material, 2–7% by weight of a sulfate, 2–7% by weight of a stearate, and 0.5–2% by weight of a skin forming agent. The skin forming agent contains 75–85% by weight of the gel material, 6–10% by weight of calcium chloride, and 9–15% by weight of alum.

BRIEF DESCRIPTION OF THE DRAWING

In a drawing which illustrate an embodiment of the invention.

DETAILED DESCRIPTION OF THE PREFERRED EMBODIMENT

Figure 1:
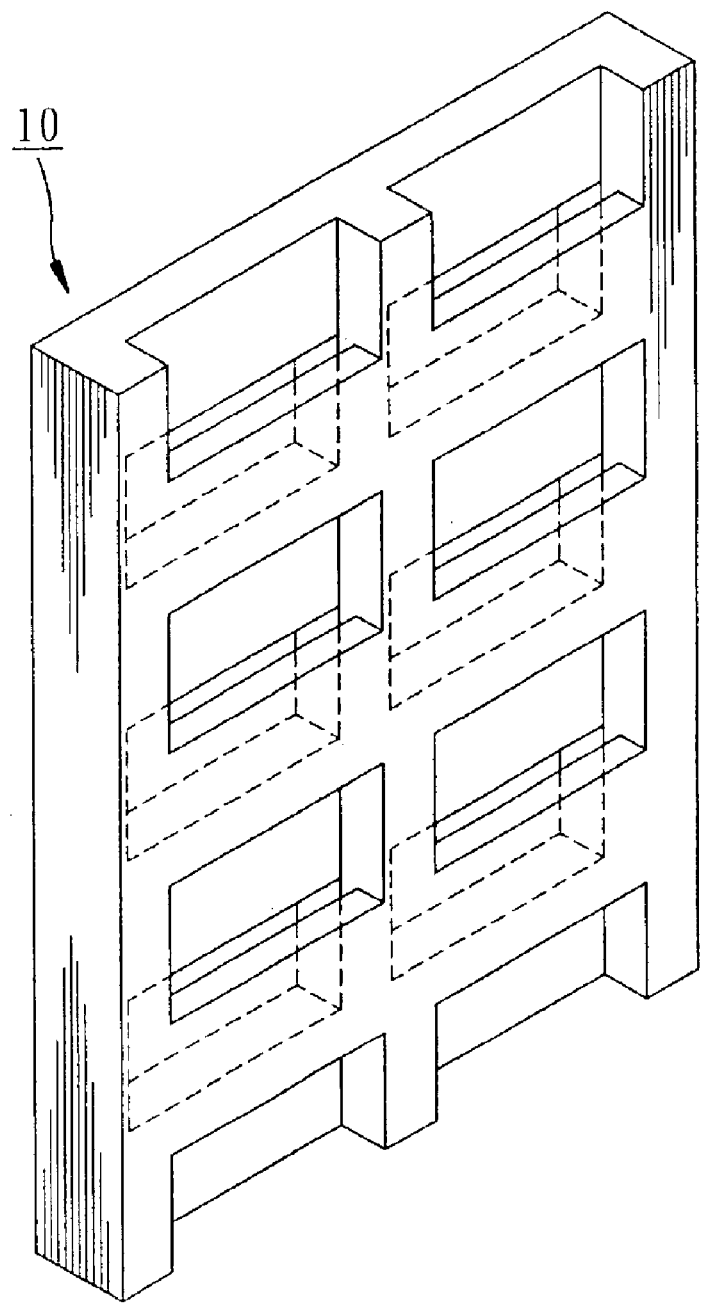
FIG. 1 is a perspective view of a pallet made from an agricultural solid waste composition according to the present invention.

FIG. 1 illustrates a pallet 10 made from an agricultural solid waste composition according to the present invention. The agricultural solid waste composition contains: 81–90% by weight of a powdered agricultural solid waste; 9–15% by weight of water; and 1–4% by weight of a binder. The binder contains 85–95% by weight of a gel material, 2–7% by weight of a sulfate, 2–7% by weight of a stearate, and 0.5–2% by weight of a skin forming agent. The skin forming agent contains 75–85% by weight of the gel material, 6–10% by weight of calcium chloride, and 9–15% by weight of alum.

The agricultural solid waste is selected from the group consisting of plant stems, crop shells, residues of vegetables, wood shavings, sawdust, starch, and mixtures thereof, and has a size ranging from 60–120 mesh.

The gel material contains 24–32% by weight of latex, 18–24% by weight of pectin, 18–24% by weight of gelatin, and other food grade gel materials.

Preferably, the sulfate is selected from the group consisting of barium sulfate, iron sulfate, zinc sulfate, manganese sulfate, and chromium sulfate.

Preferably, the stearate is selected from the group consisting of magnesium stearate, calcium stearate, zinc stearate, aluminum stearate, and barium stearate.

Prior to blending with the binder and water, the agricultural solid waste is water washed for about 30 minutes, is dried, and is cut and ground into powder.

The pallet 10 is a molded structure that is formed by molding the agricultural solid waste composition in a mold (not shown) at a temperature in a range of from 120 to 185° C. for about 7 to 50 seconds. The molded structure is subsequently subjected to drying, panting, and secondary drying. The resultant pallet 10 has an excellent mechanical strength and high hardness, and is bio-degradable such that it can decompose in about three months after landfill disposal.

Since the pallet 10 is made from the agricultural solid waste composition, the aforesaid drawbacks associated with the prior art can be eliminated.

With the invention thus explained, it is apparent that various modifications and variations can be made without departing from the spirit of the present invention. It is therefore intended that the invention be limited only as recited in the appended claims.

I claim:

1. An agricultural solid waste composition, comprising:
   81–90% by weight of a powdered agricultural solid waste;
   9–15% by weight of water; and
   1–4% by weight of a binder;
   wherein said binder contains 85–95% by weight of a gel material, 2–7% by weight of a sulfate, 2–7% by weight of a stearate, and 0.5–2% by weight of a skin forming agent; and
   wherein said skin forming agent contains 75–85% by weight of said gel material, 6–10% by weight of calcium chloride, and 9–15% by weight of alum.

2. The composition of claim 1, wherein said agricultural solid waste is selected from the group consisting of plant stems, crop shells, residues of vegetables, wood shavings, sawdust, starch, and mixtures thereof, and has a size ranging from 60–120 mesh.

3. The composition of claim 1, wherein said gel material is a mixture of latex, pectin, and gelatin.

4. The composition of claim 1, wherein said sulfate is selected from the group consisting of barium sulfate, iron sulfate, zinc sulfate, manganese sulfate, and chromium sulfate.

5. The composition of claim 1, wherein said stearate is selected from the group consisting of magnesium stearate, calcium stearate, zinc stearate, aluminum stearate, and barium stearate.

6. A bio-degradable product, comprising:
   a molded structure that is formed by molding an agricultural solid waste composition;
   wherein said agricultural solid waste composition comprises:
   81–90% by weight of a powdered agricultural solid waste;
   9–15% by weight of water; and
   1–4% by weight of a binder;
   wherein said binder contains 85–95% by weight of a gel material, 2–7% by weight of a sulfate, 2–7% by weight of a stearate, and 0.5–2% by weight of a skin forming agent; and
   wherein said skin forming agent contains 75–85% by weight of said gel material, 6–10% by weight of calcium chloride, and 9–15% by weight of alum.

7. The product of claim 6, wherein said agricultural solid waste is selected from the group consisting of plant stems, crop shells, residues of vegetables, wood shavings, sawdust, starch, and mixtures thereof, and has a size ranging from 60–120 mesh.

8. The product of claim 6, wherein said gel material is a mixture of latex, pectin, and gelatin.

9. The product of claim 6, wherein the molding is carried out at a temperature in a range of from 120 to 185° C.

10. The product of claim 6, wherein said sulfate is selected from the group consisting of barium sulfate, iron sulfate, zinc sulfate, manganese sulfate, and chromium sulfate.

11. The product of claim 6, wherein said stearate is selected from the group consisting of magnesium stearate, calcium stearate, zinc stearate, aluminum stearate, and barium stearate.

* * * * *